US012776609B2

(12) United States Patent
He et al.

(10) Patent No.: US 12,776,609 B2
(45) Date of Patent: Oct. 27, 2026

(54) CONNECTOR FOR PREVENTING SIGNAL INTERFERENCE

(71) Applicant: Shenzhen Alex Connector Co Ltd, Shenzhen (CN)

(72) Inventors: Xiling He, Shenzhen (CN); Huilin Wu, Shenzhen (CN); Jijian Wei, Shenzhen (CN); Haiqiu Lu, Shenzhen (CN); Xiao'an Wang, Shenzhen (CN); Xiaobin Wang, Shenzhen (CN); Jun Yang, Shenzhen (CN); Zhaoyang Tang, Shenzhen (CN); Di Jiang, Shenzhen (CN); Mingliang Xia, Shenzhen (CN); Junzhong Liu, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 336 days.

(21) Appl. No.: 18/399,948

(22) Filed: Dec. 29, 2023

(65) Prior Publication Data

US 2025/0062572 A1 Feb. 20, 2025

(30) Foreign Application Priority Data

Aug. 18, 2023 (CN) ......................... 202322244516.8

(51) Int. Cl.

| | |
|---|---|
| ***H01R 13/64*** | (2006.01) |
| ***H01R 13/40*** | (2006.01) |
| ***H01R 13/646*** | (2011.01) |
| ***H01R 13/648*** | (2006.01) |

(52) U.S. Cl.

CPC ........... *H01R 13/646* (2013.01); *H01R 13/40* (2013.01); *H01R 13/648* (2013.01)

(58) Field of Classification Search

CPC .... H01R 13/646; H01R 13/40; H01R 13/648; H01R 13/6471; H01R 13/6594; H01R 13/6585; H01R 12/714; H01R 12/79

See application file for complete search history.

(56) References Cited

U.S. PATENT DOCUMENTS

| | | | | |
|---|---|---|---|---|
| 7,435,132 | B1 * | 10/2008 | Fong ................ | H01R 13/65918 439/497 |
| 9,059,549 | B2 | 6/2015 | Wu et al. | |
| 11,355,875 | B2 | 6/2022 | Wang et al. | |
| 11,682,852 | B2 * | 6/2023 | Little ..................... | H01R 12/71 439/607.09 |
| 2004/0002262 | A1 * | 1/2004 | Murayama ....... | H01R 13/65918 439/607.1 |

(Continued)

*Primary Examiner* — Truc T Nguyen

(57) ABSTRACT

The present utility model discloses a connector for preventing signal interference, comprising: a connector housing; a plurality of groups of wires arranged in the connector housing, wherein any group of the wires comprise a signal wire and a ground wire, and the ground wires in the plurality of groups of the wires are connected in series; and a metal partition plate, wherein a plurality of spacers are arranged on the metal partition plate, the spacers are positioned on both sides of the wires to separate two adjacent groups of the wires, and the spacers are connected to the ground wires. The present utility model solves the problem of signal interference caused by the absence of an isolation structure between wires in the existing connector.

5 Claims, 3 Drawing Sheets

(56) References Cited

U.S. PATENT DOCUMENTS

| | | | | |
|---|---|---|---|---|
| 2005/0208823 | A1* | 9/2005 | Moriyama | H01R 43/20<br>439/494 |
| 2009/0170373 | A1* | 7/2009 | Pan | H01R 13/514<br>439/607.36 |
| 2014/0065884 | A1 | 3/2014 | Wu et al. | |
| 2014/0220822 | A1* | 8/2014 | Keyser | H01R 12/53<br>439/607.46 |
| 2020/0006898 | A1 | 1/2020 | Yang et al. | |
| 2021/0091491 | A1 | 3/2021 | Wang et al. | |
| 2022/0407268 | A1* | 12/2022 | Guo | H01R 12/75 |
| 2023/0127481 | A1* | 4/2023 | Chua | H01R 13/6596<br>439/607.05 |

* cited by examiner

CONNECTOR FOR PREVENTING SIGNAL INTERFERENCE

CROSS REFERENCE TO RELATED APPLICATION

This application claims priority benefit of Chinese patent Application No. 202322244516. 8, filed on Aug. 18, 2023, and the entire contents of which are incorporated herein by reference.

TECHNICAL FIELD

The present utility model relates to the technical field of connectors, and in particular to a connector for preventing signal interference.

BACKGROUND

A connector is a common component that is used for bridging communication between blocked or isolated circuits in a circuitry, so as to allow a current to flow therethrough and enable the circuitry to realize a predetermined function. The connector is an indispensable component in an electronic device, and there are various types of connectors depending on the application object, frequency, power, application environment, and the like.

In existing connectors, there is no effective separation between two adjacent groups of wires, such that signals are prone to dispersion and the wires are prone to suffering from signal interference, which affects the signal transmission.

SUMMARY

A primary objective of the present utility model is to provide a connector for preventing signal interference, which aims to solve the problem of signal interference caused by the absence of an isolation structure between wires in the existing connector.

In order to achieve the above objective, the present utility model provides a connector for preventing signal interference, comprising: a connector housing; a plurality of groups of wires arranged in the connector housing, wherein any group of the wires comprise a signal wire and a ground wire, and the ground wires in the plurality of groups of the wires are connected in series; and a metal partition plate, wherein a plurality of spacers are arranged on the metal partition plate, the spacers are positioned on both sides of the wires to separate two adjacent groups of the wires, and the spacers are connected to the ground wires.

Optionally, the metal partition plate is provided as a copper or stainless steel one-piece molded structure.

Optionally, the wire comprises two signal wires and two ground wires, the two signal wires and the two ground wires are separated by an insulating medium, and the two signal wires are respectively connected to elastic pieces that are connected to a PCB motherboard.

Optionally, the wires are arranged in a straight line, and the ground wires in two adjacent groups of the wires are connected.

Optionally, the connector further comprises an insulating protective sleeve, and the insulating protective sleeve covers ends of the wires.

Optionally, the insulating protective sleeve is provided as a plastic one-piece molded structure.

Optionally, the metal partition plate is mounted on the insulating protective sleeve, and the insulating protective sleeve is provided with a slot for the spacer to pass through.

Optionally, one end of the metal partition plate is provided with a pressing sheet for pressing the insulating protective sleeve against the connector housing, and the other end of the metal partition plate is welded to the connector housing.

The present utility model has the beneficial effects that: the structure of the existing connector is improved by sequentially connecting the ground wires in individual wires on the connector in series, then adding the metal partition plate to separate two adjacent groups of the wires via the spacers on the metal partition plate and connect the spacers to the ground wires, and separating any group of the wires in a closed channel composed of the spacer and the ground wire, such that signal dispersion is prevented on the wires, signal interference is avoided between the wires, and the stability of signal transmission is ensured.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
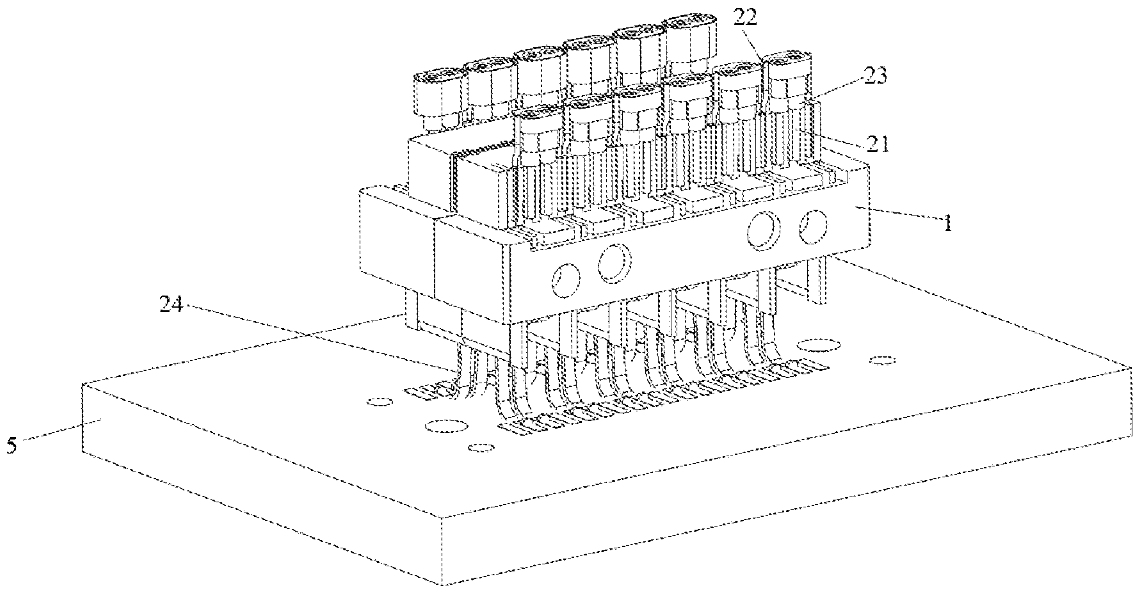
FIG. 1 is a schematic diagram of a structure of a connector without a metal spacer and an insulting protective sleeve mounted thereon according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

Figure 2:
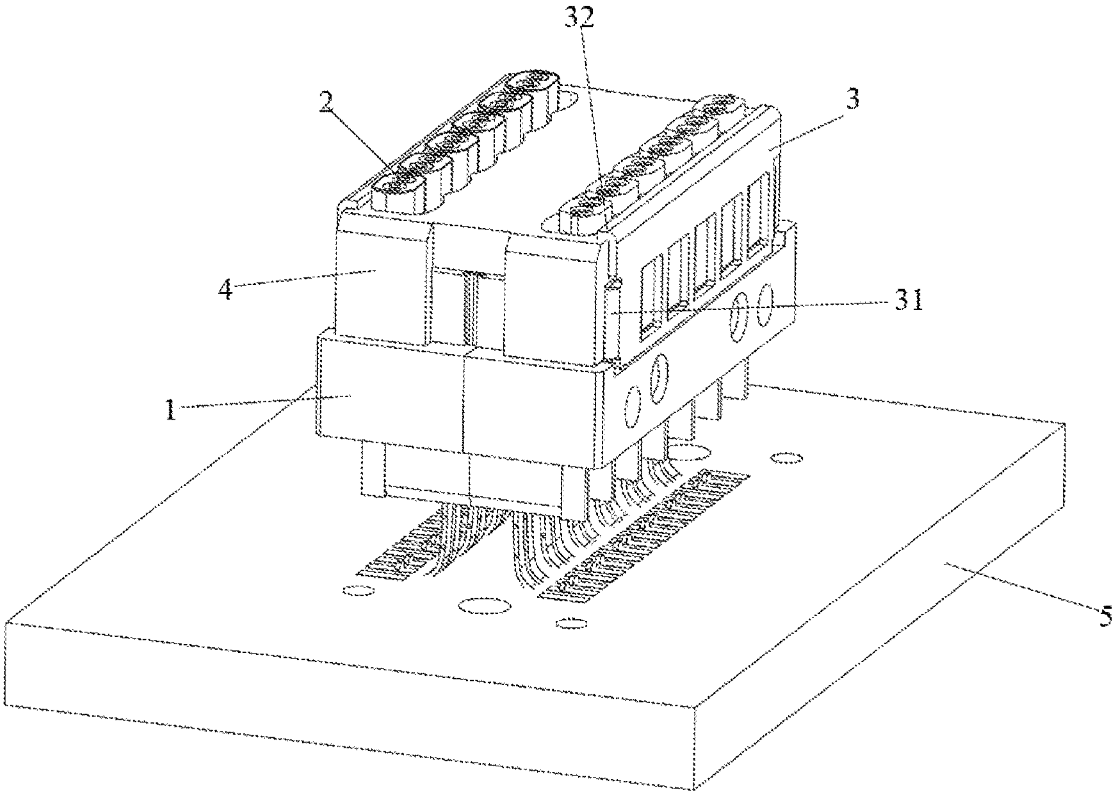
FIG. 2 is a schematic diagram of an overall structure of a connector according to the present utility model.
Figure 3:
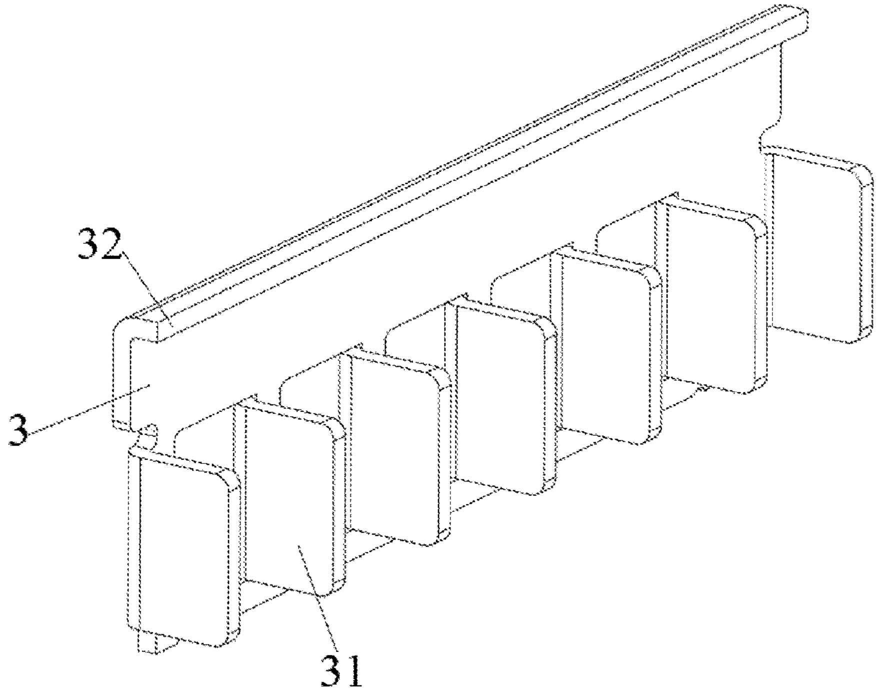
FIG. 3 is a schematic diagram of a structure of a metal spacer according to the present utility model.
Figure 4:
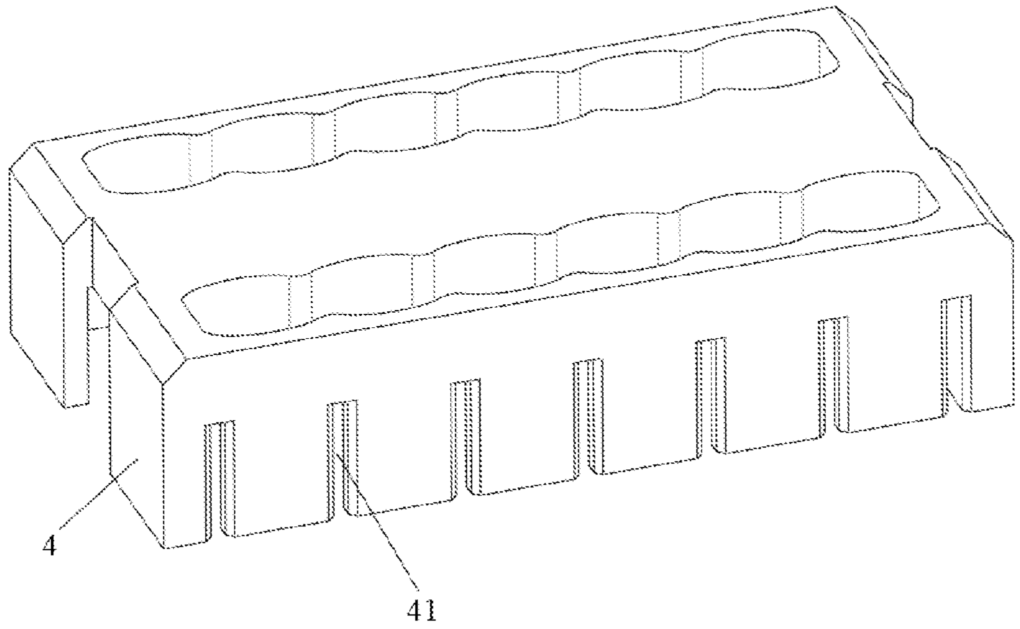
FIG. 4 is a schematic diagram of a structure of an insulting protective sleeve according to the present utility model.

Referring to FIGS. 1 and 2, an embodiment of the present utility model provides a connector for preventing signal interference, comprising: a connector housing 1; a plurality of groups of wires 2 arranged in the connector housing 1, wherein any group of the wires 2 comprise a signal wire 21 and a ground wire 22, and the ground wires 22 in the plurality of groups of the wires 2 are connected in series; and a metal partition plate 3, wherein a plurality of spacers 31 are arranged on the metal partition plate 3, the spacers 31 are positioned on both sides of the wires 2 to separate two adjacent groups of the wires 2, and the spacers 31 are connected to the ground wires 22.

This embodiment sequentially connects the ground wires 22 in individual wires 2 on the connector in series, then adds the metal partition plate 3 to separate two adjacent groups of the wires 2 via the spacers 31 on the metal partition plate 3 and connect the spacers 31 to the ground wires 22, and separates any group of the wires 2 in a closed channel composed of the spacer 31 and the ground wire 22, such that signal dispersion is prevented on the wires 2, signal interference is avoided between the wires 2, and the stability of signal transmission is ensured.

Specifically, in this embodiment, the wire 2 comprises two signal wires 21 and two ground wires 22, the two signal wires 21 and the two ground wires 22 are separated by an insulating medium 23, and the two signal wires 21 are respectively connected to elastic pieces 24 that are connected to a PCB motherboard 5. The two signal wires 21 of the wire 2 are wrapped into a whole through the insulating medium 23, the two ground wires 22 are then arranged outside the insulating medium 23, the two ground wires 22 are stacked and distributed on both sides of the wire 2, and the wire 2 is mounted on the connector housing 1, and then the elastic pieces 24 are respectively connected to ends that are of the signal wires 21 and that extend out of the connector housing 1, to facilitate the connection between the connector and the PCB motherboard 5. Further, in this embodiment, the wires 2 are arranged in a straight line, two rows of the wires 2 are arranged on the connector housing 1, and the ground wires 22 in two adjacent groups of the wires 2 are connected in series; the metal partition plate 3 is then added, and a plurality of spacers 31 are arranged on the metal partition plate 3 in the length direction of the metal partition plate; after the metal partition plate 3 is mounted, the spacers 31 are respectively distributed between two adjacent wires 2 to separate the two adjacent wires 2; and meanwhile, the spacers 31 are further connected to the ground wires 22. In this way, the spacers 31 are conducted with the ground wires 22 during use to form a closed channel, and any of the wires 2 is distributed in a respective channel, such that signals can be enclosed in the channel, signal dispersion is effectively avoided on the signal wire 21, and therefore signal interference is avoided between adjacent wires 2, and the stability of signal transmission is ensured. In the described embodiments, the "elastic pieces" refer to electrically conductive contact members.

Further, the metal partition plate 3 is provided as a copper or stainless steel one-piece molded structure. It should be noted that, in order to ensure the metal partition plate is conducted with the ground wire 22 to form a closed channel, the partition plate is made of a metal material. As a preferred embodiment, a copper or stainless steel material may be adopted in this embodiment to facilitate production and ensure a more stable structure.

Further, the connector further comprises an insulating protective sleeve 4, and the insulating protective sleeve 4 covers ends of the wires 2. To improve the mounting performance in use, an insulating protective sleeve 4 can be added at ends of the wires 2 for insulation protection. In this embodiment, after the insulating protective sleeve 4 is added, the insulating protective sleeve 4 is first sleeved at the ends of the wires 2 when being mounted to wrap the wires 2, and in order to ensure the formation of the closed channel, the insulating protective sleeve 4 is then provided with a slot 41 for the spacer 31 to pass through. In this way, after the metal partition plate 3 is mounted on the insulating protective sleeve 4, the spacer 31 can correspondingly pass through the slot 41 to be conducted with the ground wire 22, which allows for a more stable and safer structure while preventing signal interference.

Further, the insulating protective sleeve 4 is provided as a plastic one-piece molded structure. The plastic material is of a certain elasticity, which allows the insulating protective sleeve 4 to be tightly wrapped outside the wire 2 and function as a buffer protection for the wire 2. Meanwhile, the plastic one-piece molding manufacturing process is simpler, and has a high manufacturing efficiency and a lower cost.

Further, one end of the metal partition plate 3 is provided with a pressing sheet 32 for pressing the insulating protective sleeve 4 against the connector housing 1, and the other end of the metal partition plate 3 is welded to the connector housing 1. It should be noted that, in order to prevent the insulating protective sleeve 4 from falling off from the connector, in this embodiment, a pressing sheet 32 is added at one end of the metal partition plate 3, and after the metal partition plate 3 is mounted in place, the pressing sheet 32 can apply a downward pressing force from one end of the insulating protective sleeve 4 to press the insulating protective sleeve 4 against the connector housing 1. Correspondingly, one end that is of the metal partition plate 3 and that is symmetrical to the pressing sheet 32 is welded on the connector housing 1 to fix the metal spacer 31, and effectively prevent the insulating protective sleeve 4 from falling off, thereby improving the structural stability.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

The invention claimed is:

1. A connector for preventing signal interference, comprising: a connector housing; a plurality of groups of wires arranged in the connector housing, wherein any group of the wires comprise at least one signal wire and at least one ground wire; and a metal partition plate, wherein a plurality of spacers are arranged on the metal partition plate, and the spacers are positioned on both sides of the wires to separate two adjacent groups of the wires;

wherein the connector further comprises an insulating protective sleeve, and the insulating protective sleeve covers ends of the wires; the metal partition plate is mounted on the insulating protective sleeve, and the insulating protective sleeve is provided with a slot for the spacer to pass through;

wherein one end of the metal partition plate is provided with a pressing sheet for pressing the insulating protective sleeve against the connector housing, and the other end of the metal partition plate is welded to the connector housing.

2. The connector for preventing signal interference according to claim 1, wherein the metal partition plate is provided as a copper or stainless steel one-piece molded structure.

3. The connector for preventing signal interference according to claim 1, wherein in any group of the wires, the at least one signal wire is two signal wires, and the at least one ground wire is two ground wires; the two signal wires and the two ground wires are separated by an insulating medium, and the two signal wires are respectively connected to elastic pieces that are connected to a PCB motherboard.

4. The connector for preventing signal interference according to claim 3, wherein the wires are arranged in a straight line, and the ground wires in two adjacent groups of the wires are connected.

5. The connector for preventing signal interference according to claim 1, wherein the insulating protective sleeve is provided as a plastic one-piece molded structure.

* * * * *